United States Patent
Arnold et al.

(10) Patent No.: US 12,276,511 B2
(45) Date of Patent: Apr. 15, 2025

(54) METHOD OF SELECTING A ROUTE FOR RECORDING VEHICLE

(71) Applicant: Aptiv Technologies AG, Schaffhausen (CH)

(72) Inventors: Michael Arnold, Düsseldorf (DE); Sönke Behrends, Düsseldorf (DE); Peet Cremer, Düsseldorf (DE); Dennis Mueller, Moers (DE)

(73) Assignee: Aptiv Technologies AG, Schaffhausen (CH)

( * ) Notice: Subject to any disclaimer, the term of this patent is extended or adjusted under 35 U.S.C. 154(b) by 343 days.

(21) Appl. No.: 17/820,814

(22) Filed: Aug. 18, 2022

(65) Prior Publication Data

US 2023/0055974 A1    Feb. 23, 2023

(30) Foreign Application Priority Data

Aug. 18, 2021   (EP) ..................... 21191928

(51) Int. Cl.
*G01C 21/00* (2006.01)
*G01C 21/34* (2006.01)

(52) U.S. Cl.
CPC ..... *G01C 21/3461* (2013.01); *G01C 21/3492* (2013.01)

(58) Field of Classification Search
CPC  G01C 21/3461; G01C 21/3492; G01C 21/00; G06N 3/006; G06N 20/00;
(Continued)

(56) References Cited

U.S. PATENT DOCUMENTS

| 6,073,063 A | 6/2000 | Leong Ong et al. |
| 6,278,921 B1 | 8/2001 | Harrison et al. |

(Continued)

FOREIGN PATENT DOCUMENTS

| CN | 101369982 | 2/2009 |
| CN | 112348992 | 2/2021 |

(Continued)

OTHER PUBLICATIONS

"Event data recorder—Wikipedia", Retrieved at: https://en.wikipedia.org/wiki/Event_data_recorder-on Jul. 28, 2022, 11 pages.
(Continued)

*Primary Examiner* — Shardul D Patel
(74) *Attorney, Agent, or Firm* — Harness, Dickey & Pierce, P.L.C.

(57) ABSTRACT

Disclosed are aspects of a method, carried out by a vehicle data recording device, that includes downloading, from a host data collecting system, a recording target and determining a plurality of possible routes for the vehicle. The method also includes, for each route, generating a route encoding in numerical values an information on predicted values of the route for metrics, a metric being a function assigning a value representing an amount of progress in achieving an elementary recording target to a piece of data. The method additionally includes providing the route encodings and additional environmental information independent of the routes to a reinforcement learning agent that selects one of the routes to optimize a reward. The method further includes recording data from in-vehicle sources while the vehicle drives along the selected route and uploading at least part of the recording data to the host data collecting system.

22 Claims, 3 Drawing Sheets

(58) Field of Classification Search
CPC .... G07C 5/008; G08G 1/0129; G08G 1/0145; G08G 1/0112
USPC ........................................................ 701/533
See application file for complete search history.

(56) References Cited

U.S. PATENT DOCUMENTS

| | | |
|---|---|---|
| 6,505,106 B1 | 1/2003 | Lawrence et al. |
| 7,564,375 B2 | 7/2009 | Brinton et al. |
| 7,715,961 B1 | 5/2010 | Kargupta |
| 9,183,679 B2 | 11/2015 | Plante et al. |
| 9,201,842 B2 | 12/2015 | Plante |
| 10,102,691 B1 | 10/2018 | Ghanbari et al. |
| 10,295,363 B1 | 5/2019 | Konrardy et al. |
| 10,789,788 B1 | 9/2020 | Ghanbari et al. |
| 2008/0258885 A1 | 10/2008 | Akhan et al. |
| 2011/0313593 A1 | 12/2011 | Cohen et al. |
| 2017/0352261 A1 | 12/2017 | Hasegawa et al. |
| 2018/0032863 A1 | 2/2018 | Graepel et al. |
| 2019/0279441 A1 | 9/2019 | Palmer et al. |
| 2019/0369637 A1 | 12/2019 | Shalev-Shwartz et al. |
| 2020/0033869 A1 | 1/2020 | Palanisamy et al. |
| 2020/0090203 A1 | 3/2020 | Reichenbach et al. |
| 2020/0174471 A1 | 6/2020 | Du et al. |
| 2020/0234144 A1 | 7/2020 | Such et al. |
| 2020/0250900 A1 | 8/2020 | Makino |
| 2020/0292343 A1* | 9/2020 | Cella .................. G01C 21/3438 |
| 2020/0363813 A1 | 11/2020 | He et al. |
| 2020/0364953 A1 | 11/2020 | Simoudis |
| 2020/0377090 A1 | 12/2020 | Seccamonte et al. |
| 2021/0014323 A1 | 1/2021 | Hayes et al. |
| 2021/0407220 A1 | 12/2021 | Fang et al. |
| 2023/0056115 A1 | 2/2023 | Arnold et al. |

FOREIGN PATENT DOCUMENTS

| | | |
|---|---|---|
| EP | 3361441 | 8/2018 |
| EP | 3618011 | 3/2020 |
| EP | 3678099 | 7/2020 |
| KR | 102164509 | 10/2020 |
| WO | 2020079685 | 4/2020 |

OTHER PUBLICATIONS

"Extended European Search Report", EP Application No. 21191933.7, Feb. 16, 2022, 9 pages.

"Extended European Search Report", EP Application No. 21191928.7, Feb. 16, 2022, 8 pages.

Al Sallab, et al., "Deep Reinforcement Learning framework for Autonomous Driving", Apr. 2017, 7 pages.

Bast, et al., "Route Planning in Transportation Networks", Apr. 20, 2015, 65 pages.

Bohm, et al., "New developments on EDR (Event Data Recorder) for automated vehicles", Mar. 20, 2020, pp. 140-146.

Gonzalez, et al., "A Review of Motion Planning Techniques for Automated Vehicles", Nov. 2015, 12 pages.

Lei, et al., "Dynamic Path Planning of Unknown Environment Based on Deep Reinforcement Learning", Sep. 2018, 11 pages.

Liu, et al., "Edge Computing for Autonomous Driving: Opportunities and Challenges", Aug. 2019, pp. 1697-1716.

Paden, et al., "A Survey of Motion Planning and Control Techniques for Self-driving Urban Vehicles", Apr. 25, 2016, 27 pages.

Petri, "Evaluation of lightweight TPMs for automotive software updates over the air", Jun. 2016, 15 pages.

Talpaert, et al., "Exploring applications of deep reinforcement learning for real-world autonomous driving systems", Jan. 16, 2019, 9 pages.

Yurtsever, et al., "A Survey of Autonomous Driving: Common Practices and Emerging Technologies", Apr. 7, 2020, 27 pages.

Zafar, et al., "Methodology for Path Planning and Optimization of Mobile Robots: A Review", Jan. 2018, pp. 141-152.

Delling, et al., "Engineering Route Planning Algorithms", Jun. 2009, 23 pages.

* cited by examiner

METHOD OF SELECTING A ROUTE FOR RECORDING VEHICLE

INCORPORATION BY REFERENCE

This application claims priority to European Patent Application Number 21191928.7, filed Aug. 18, 2021, the disclosure of which is incorporated by reference in its entirety.

BACKGROUND

A known method for recording data for algorithm development and validation purposes for advanced driver-assistance systems (ADAS) uses a single vehicle or a fleet of vehicles outfitted with the desired sensor hardware including typically radars, lidars, and cameras. The drivers of the vehicles then drive around locations to provide valuable and useful data for development and validation purposes. While each vehicle drives, the sensor data is logged using an automotive data recording device onto a hard drive equipped in the vehicle. See, for example, U.S. Pat. No. 6,073,063A, which "relates to automotive data recorder devices which collect and record information from an engine computer and other vehicle subsystems over a long period of time." After recording, the hard drives of the recording vehicles are brought back to a collection site for further distribution and storage of the data.

SUMMARY

There are many drawbacks to the above known method of collecting data from vehicles. One of the drawbacks is that the drivers usually drive randomly around, or they make their own judgment on where to drive for recording interesting data. Consequently, the value of the recording data is uncertain and may not be as useful as hoped. It is also needed to select part of the recording data after recording and a lot of uninteresting recording data may be discarded.

Therefore, there is a need to increase the amount of data of high value that is recorded along a route.

The present disclosure relates to the field of recording data by a fleet of data recording vehicles and uploading the recording data to a host data collecting system. The recording data recorded by the recording vehicles while driving along a route can include raw data captured by sensors, data derived from the raw data (for example object detection data), and/or external data (for example GPS data, weather data, etc.). In the automotive industry, such recording data from vehicles is collected for algorithm development and/or validation purposes, for example for training a neural network, especially in the advanced driver-assistance systems (ADAS) and in the autonomous driving domain.

The present disclosure concerns a computer-implemented method, carried out by a vehicle data recording device in a vehicle, including the following steps: downloading, from a host data collecting system, a recording target for recording data along a route; at a current time ($t_0$), determining a plurality of routes that the vehicle can take; for each route, generating a route encoding that encodes in numerical values an information on predicted values of said route for a plurality of metrics, a metric being a function assigning a value representing an amount of progress in achieving an elementary recording target to a piece of data; providing the route encodings and additional environmental information that is independent of the routes to a reinforcement learning agent that selects one of the routes in order to optimize a reward; recording data from data sources in the vehicle over time while the vehicle drives along the selected route; uploading at least part of the recording data to the host data collecting system and, in return, receiving a reward from the host data collecting system; and providing the reward to the reinforcement learning agent.

The present method allows a vehicle that has received a recording target to drive and record data along a route that is expected to optimize the rewards for successfully uploading the recording data to the host data collecting system, instead of driving randomly. The rewards are generated by the host collecting system, taking into account the recording target.

In an embodiment, the step of generating a route encoding for each route includes the steps of: dividing said route into route segments; and generating a feature vector for each route segment, wherein environmental features related to the route segment and relevant for the metrics are encoded into numerical values to form a component of the feature vector.

In an embodiment, the step of generating a feature vector for each route segment includes a step of encoding into numerical values past information on what happened just before the current time ($t_0$) to form another component of the feature vector.

The method can further include, for each route segment, a step of inputting the corresponding feature vector into a machine learning system of value prediction for the plurality of metrics and providing, at the output of the machine learning system, a metric value prediction vector including predicted values of said route segment for the plurality of metrics.

The metric value prediction vector of each route segment can further include an uncertainty information.

In an embodiment, the metric value prediction vectors of the segments of each route are grouped into a high-dimensional route encoding, the high-dimensional route encodings of the plurality of routes are translated into fixed-length route encodings of lower dimension and the route encodings of fixed-length are provided as inputs to the reinforcement learning agent.

A selector can pre-select a short list of the most promising route encodings and only the short list of route encodings can be provided as input to the reinforcement learning agent.

In an embodiment, the method further includes, in a preliminary step: obtaining historical data related to a plurality of recordings performed when driving along given past routes; dividing each past route into route segments and evaluating values of each route segment for the plurality of metrics based on the historical data; and training the machine learning system to compute the evaluated values related to the plurality of metrics for the corresponding route segments.

The plurality of routes can be determined by using a tree expansion algorithm.

The present disclosure also concerns a vehicle data recording device, including at least one interface configured to receive recording data from data sources in the vehicle and to transmit recording data to upload to a host data collecting system; a storing module for storing the recording data; and a processor for controlling the execution of the steps of the method previously defined.

The present disclosure also concerns a computer program including instructions to cause the above-defined vehicle data recording device to execute the steps of the method previously defined.

The present disclosure further concerns a computer-readable medium having stored thereon the above-defined computer program.

BRIEF DESCRIPTION OF THE DRAWINGS

Other features, purposes, and advantages of the disclosure will become more explicit by means of reading the detailed statement of the non-restrictive embodiments made with reference to the accompanying drawings.

DETAILED DESCRIPTION

Figure 1:
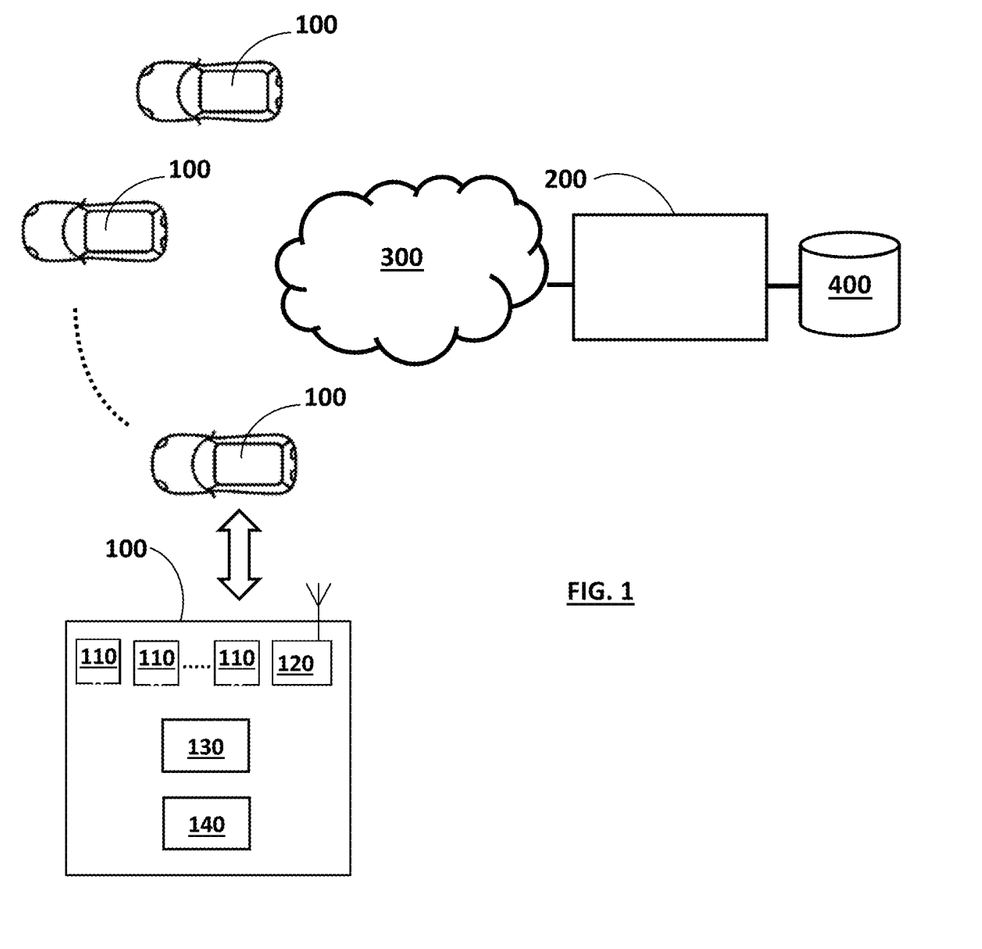
FIG. 1 shows a distributed system for collecting data from recording vehicles into a host data collecting system, according to an embodiment.

The present disclosure concerns a computer-implemented method, carried out by an in-vehicle data recording device 140 in a recording vehicle 100, for recording data while the vehicle 100 drives along a selected route and uploading at least part of the recording data to a host data collecting system 200. As will be explained later in more detail, the route along which the data is recorded is selected among a plurality of routes in order to optimize rewards from the host data collecting system 200 after and/or during uploading recording data.

FIG. 1 shows a distributed system for collecting data from a fleet or a plurality of recording vehicles 100 by the host data collecting system 200.

In an embodiment, the recording vehicles 100 can communicate with the host data collecting system 200 over-the-air, for example through a mobile communication network 300, such as a 5G network.

The data from each recording vehicle 100 can include different types of data such as raw data, derived data, and/or external data. The data collected from the vehicle 100 is recorded over time, typically while the vehicle is driving along a route.

The raw data (also called elementary data or source data) is data that has not been processed. The raw data includes, in a non-limitative manner, sensor data from sensors mounted in the vehicle 100 (such as radars, lidars, and cameras), GPS data, speed data, yaw rate data, etc. . . . .

The derived data include data derived from raw data by data processing. The data processing can be carried out by hardware means and/or software means in the vehicle 100, that execute processing operations and/or algorithms (for example machine learning algorithms or any other type of algorithms). Some in-vehicle hardware and software components can perform an object detection based on radar, lidar, or camera data (with or without sensor fusion); a semantic segmentation on camera data; an encoding of signatures describing various aspects of an environmental information (in the environment of the vehicle); a computation of data structures and/or statistical information derived from an object detection module; or another algorithmic output.

The external data include data from sources external to the vehicle 100. Such external data can be acquired via API (for Application Programming Interface) calls to third party data providers via the mobile communication network 300. Non-limitative examples for such external data include traffic data (e.g., traffic flow, construction areas, etc.), weather service data, time related data (e.g., national holiday, weekday, week-end day, etc.), map services data (e.g., road layout information, satellite images, mobile network coverage, etc.), current transmission rate through the mobile communication network 300, data from environmental sources (e.g., shops, schools, bus stations, parks, etc.), data from routing services, or data from the host data collecting system 200.

The host data collecting system 200 is responsible for providing a recording (collection) target $T_0$, downloading (transmitting) it to the fleet of recording vehicles 100 and, in return, collecting recording data collected by each vehicle 100 of the fleet. The host data collecting system 200 is also responsible for transmitting a reward information to each vehicle 100 after and/or while said vehicle 100 uploads recording data to the host data collecting system 200.

A recording target $T_0$ defines one or more elementary or atomic recording (collection) targets $c_k$, with k=0, . . . , m, and includes one or more metrics $v_{c_k}$, also called data value metrics, in relation to the elementary recording targets $c_k$. In the present disclosure, a metric $v_{c_k}$ is a function assigning a data value (in other words: a number) to a piece of data corresponding to a given point in time i, or to a given time slot, said data value representing an amount of progress in achieving the corresponding elementary recording target $c_k$. In other words, each metric $v_{c_k}$ allows to measure a progress towards an elementary recording target $c_k$. An elementary recording target $c_k$ can be a quantified target defined by a given target amount or number.

Illustrative and non-limitative examples of elementary recording targets are given below:
- a number of kilometers on specific roads (i.e. highway, city, . . . );
- a specific time of recordings spent in specific scenarios (i.e. X amount of hours spent in traffic jams, day, dawn, night, weekend, rush hour, . . . );
- a number of unique objects of a specific class (i.e. bike, truck, pedestrian, . . . );
- a number of specific maneuvers (i.e. overtaking, lane change, . . . );
- a number of specific road scenarios (i.e. roundabouts, specific crossing constellations, passenger crossings, construction areas, tunnels, bridges, . . . );
- a number of scenarios selected by active learning methods or predictive models; or
- a number of scenarios that are rarely detected.

Optionally, the elementary recording targets $c_k$ could be constrained somehow in order to diversify the data collection. For example, a constraint can be to perform the data collection across multiple regions (countries, cities, . . . ). Another constraint can be to limit data collection along roads already recorded in the past.

The elementary recording targets $c_k$ can be in the form of code to be executed by a computer or a processor.

The recording target $T_0$ can include m+1 metrics $v_{c_k}$ related to m+1 different elementary recording targets $c_k$ (forming a set C of elementary recording targets $c_k$: C= $\{c_0, \ldots, c_m\}$), with m≥0 and the metric index k ranging from 0 to m. In that case, the recording target $T_0$ can further include a collection policy P that defines how to weight the different elementary recording targets $c_k$ in the recording target $T_0$. A collection policy P defines a way to merge multiple elementary measures or metrics. In an embodiment, the collection policy P attributes respective weights $p_{c_k}$, to be applied to the different metrics $v_{c_k}$. In other words, the collection policy P defines m+1 respective weights $p_{c_k}$, for the m+1 metrics $v_{c_k}$ related to m+1 elementary recording targets $c_k$, with 0≤k≤m. The collection policy can be expressed as follows: P={$p_{c_0}, \ldots, p_{c_m}$}. The set of weights {$p_{c_0}, \ldots, p_{c_m}$} is preferably such that $\Sigma_{k=0}^{m} p_{c_k}=1$.

As previously explained, each metric $v_{c_k}$ is a function that assigns a data value to a recording data point for time i (in other word: to a piece of data for a given point i in time) in a recording R. A recording R is a data collection captured by a recording vehicle 100, for example on a given route or during a given period of time, and contains raw data provided by sensors in the recording vehicle 100 and/or data from other data sources in the recording vehicle 100 (including derived data and/or external data).

In addition, a value V(RC) of a recording RC of data aggregated over all time points {$t_0, \ldots, t_n$} and elementary recording targets {$c_0, \ldots, c_m$}, according to the collection policy P, also termed as "recording value", can be expressed as follows:

$$V(RC)=\Sigma_{t_0}^{t_n}\Sigma_{k=c_0}^{c_m} p_{c_k} v_{c_k}(RC,t_i) \qquad (1)$$

In an embodiment, the metrics $v_{c_k}$ produce values in a normalized range (i.e., [0, . . . 1.]). In that case, the data value assigned to a recording data point in time i is included between 0 and 1 (including the extremity values 0 and 1).

In a first illustrative example, the elementary recording target is a number of overtaking maneuvers and the value metric attributes the value 1 when an overtaking maneuver is happening and a value 0 when no overtaking maneuver is happening. In a second illustrative example, the elementary recording target is a number of bikes, and the value metric gives a value representing a number of bikes in a scene. The value is normalized between 0 and 1 by a mapping function, for example based on a maximal number of bikes for example, or alternatively based on an average number. The normalization facilitates the combination or aggregation of the data values computed by the different value metrics, as explained later.

The collection policy P is used to aggregate the m+1 sets of data values over time respectively produced by the m+1 metrics $v_{c_k}$ in a recording R. It allows to produce a set of aggregated data values over time for the recording R.

With reference to FIG. 1, each recording vehicle 100 has a plurality of sources of data (raw data, derived data, and/or external data) 110, a radio transmitter-receiver 120, a central processing unit 130, and a data recording device 140.

The sources of data 110 include hardware components and software components that provide raw data and/or derived data, and optionally external data. The data sources 110 can be of different types such as:
   sensors (e.g., radars, lidars, and/or cameras) providing raw data (e.g., radar data, lidar data, and/or camera data);
   calculators for processing data, receiving input data such as raw data and outputting derived data;
   machine learning or algorithmic modules for performing one or more tasks (e.g., object detection), receiving input data (e.g., raw data), and outputting derived data; or
   functional modules receiving external data through the network 300, etc.

The radio transmitter-receiver 120 is responsible for transmitting and receiving radio signals (including information and/or messages and/or data) through the mobile communication network 300.

All the elements 110, 120, 140 of the recording vehicle 100 can be connected to the central processing unit 130 that controls their operation.

The in-vehicle data recording device 140 is responsible for:—
   predicting and selecting a route that is expected to maximize (optimize) the rewards for uploading recording data collected along the selected route in accordance with a recording target provided by the host data collecting system 200;
   recording data from the data sources 110 in the vehicle 100, when the vehicle 100 is driving along the selected route;
   uploading (in other words: transmitting) at least part of the recording data to the host data collecting system 200 over-the-air, through the mobile communication network 300; or
   receiving, in return, rewards from the host data collecting system 200.

The in-vehicle data recording device 140 has hardware means and software means (in other words: hardware components and software components) to implement the method, described later, of recording data from the recording vehicle 100 and uploading at least part of the recording data to the host data collecting system 200 over-the-air.

In an embodiment, the communication between the data recording device 140 and the host data collecting system 200 is performed via the in-vehicle radio transmitter-receiver 120. Alternatively, the data recording device 140 could include a radio transmitter-receiver to communicate directly with the host data collecting system 200.

Figure 2:
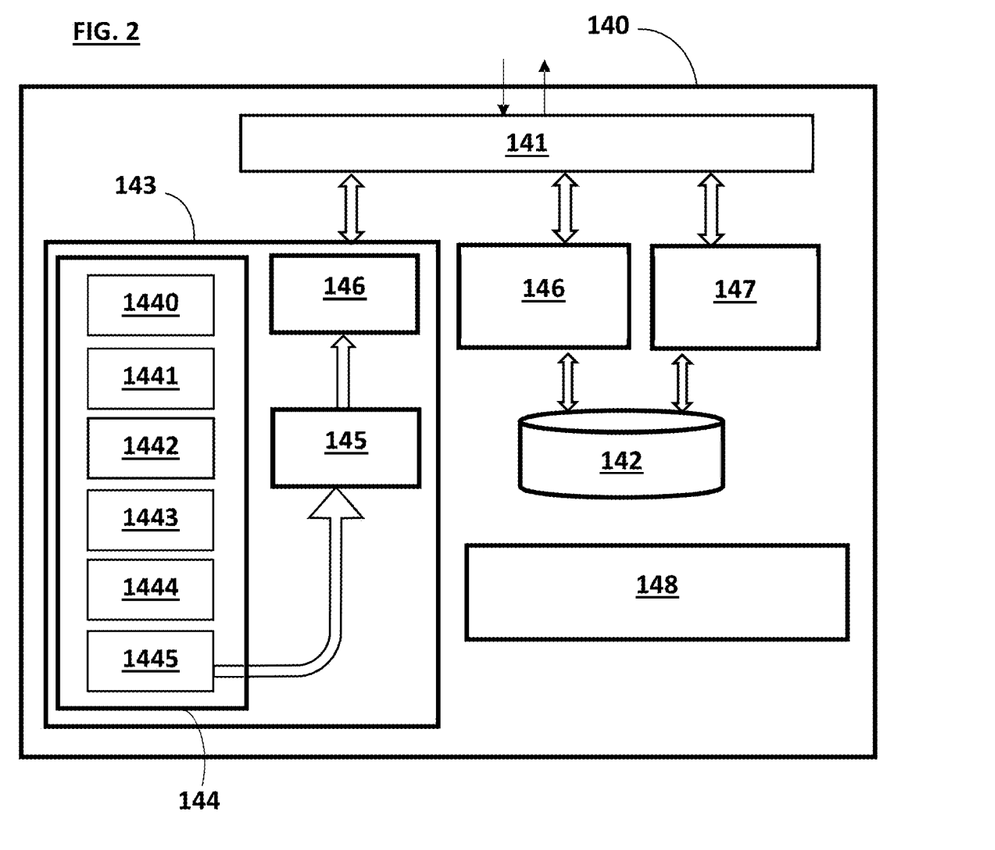
FIG. 2 shows a functional block diagram of an in-vehicle data recording device, according to an embodiment.

As shown in FIG. 2, in an embodiment, the in-vehicle data recording device 140 has an input/output interface 141 to interface with the vehicle 100, a storing module 142, a route planning module 143, a data recorder 147, a recording data uploader 148, and a central processing unit (CPU) 149.

The input/output interface 141 interfaces with the vehicle 100. It allows to receive data from in-vehicle data sources 110 and messages from the host data collecting system 200 received via the transmitter-receiver 120 of the vehicle 100, and it allows to transmit data to upload to the host data collecting system 200 via the transmitter-receiver of the vehicle 100, as will be explained later.

The storing module 142 stores the recording data collected from the vehicle 100 before uploading at least part of said recording data to the host data collecting system 200.

The route planning module 143 is responsible for planning a candidate route for the vehicle 100, in accordance with the recording target $T_0$, with said planned candidate route(s) being expected to provide recording data of high value for the recording target $T_0$. The route planning module 143 has two components: the first component is a route encoder 144 and the second component is a route selector 146.

Optionally, the route planning module 143 includes a route pre-selector 145 that selects a short list of routes encoded by the first component 144, to provide only the short list to the route selector 146.

The first component (route encoder) 144 is responsible for computing route encodings. A route encoding is a representation of a route. It can be represented by a vector of numerical values encoding value information of the route for a plurality of metrics $v_{c_k}$, as explained later in more detail. In an embodiment, the route encoder 144 includes a car navigation system 1440, a segmentation block 1441, a feature encoder 1442, a value estimator 1443, a concatenator 1444, and a vector translator 1445.

The second component (route selector) 146 is responsible for selecting a candidate route among a list of routes associated with route encodings determined by the route encoder 144, in order to optimize (in other words: maximize) rewards received from the host data collecting system 200 during or after an upload of recording data. In an embodiment, the route selector 146 can be implemented by a reinforcement learning agent to execute the task of selecting a candidate route. The route selector 146 can take into account an additional environment information that is independent of the routes. The term "independent" means here independent of the static route features in contrast to dynamic features like weather, etc. The reinforcement learning (RL) agent that is rewarded for uploading information may be interested in having 5G band availability, to optimize its function.

The environmental factors can include the 5G band availability, how much gas is available in the car, etc. . . . . . The RL agent gets some metrics, information on what is available or not available (for example: how much gas in the vehicle, mobile network bandwidth availability, etc.).

The route pre-selector 145 has the function of preselecting a subset (short list) of routes, from among all the possible routes Ri encoded by the route encoder 144, that are promising, such as the most promising.

In an embodiment, the route encoder 144, the route pre-selector 145, and the route selector 146 include software, or program instructions, to cause the vehicle data recording device 140 to execute steps of the method that will now be described. The route encoder 144 and the route selector 146 can run on the processor 149.

Figure 3:
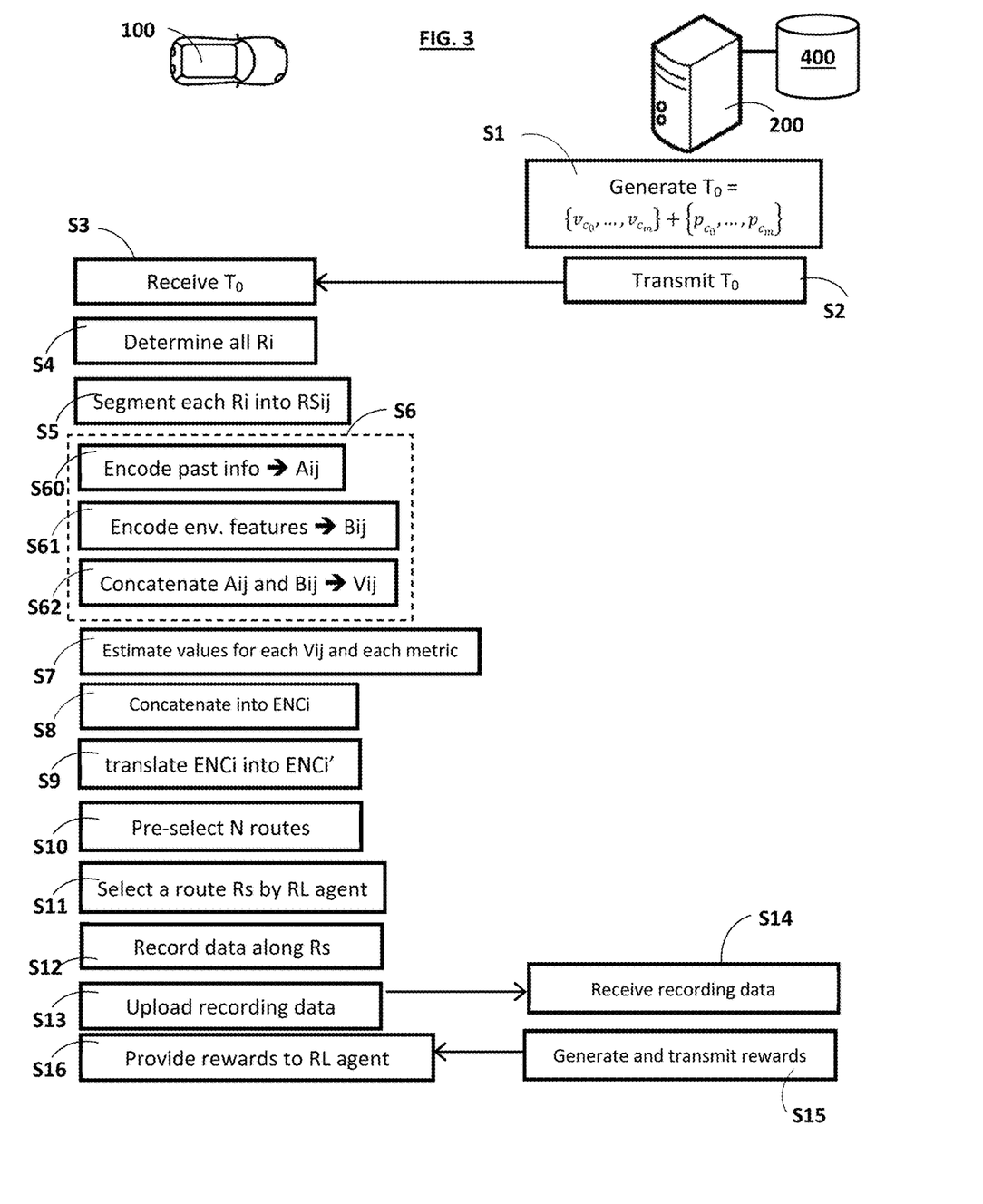
FIG. 3 shows a flowchart of a method, carried out by an in-vehicle data recording device, of recording data from the vehicle and uploading at least part of the recording data to a host data collecting system, according to an embodiment.

The computer-implemented method for recording data by the in-vehicle data recording device 140 will now be described with reference to FIG. 3, according to an embodiment.

In an initial step S1, the host data collecting system 200 provides a recording target $T_O$ for recording data by a recording vehicle. In an embodiment, the recording target $T_O$ includes m+1 data value metrics $v_{c_k}$ for assigning data values to the recording data over time, so as to measure a progress in achieving m+1 corresponding elementary (atomic) recording targets $c_k$, with k ranging from 0 to m. The set of m+1 corresponding elementary recording targets $\{c_0, \ldots, c_m\}$ is noted as C. In the present embodiment, the data value metrics $v_{c_k}$ are normalized by a mapping function that attribute values in the range [0, . . . , 1]. Furthermore, the recording target $T_O$ includes a collection policy P attributing respective weights $p_{c_k}$ to the data value metrics $v_{c_k}$. The sum of the m+1 weights $p_{c_0}, p_{c_1}, \ldots, p_{c_m}$ is equal to 1.

In a step S2, the host data collecting system 200 transmits the recording target $T_O$ to each recording vehicle 100 of the fleet (or the plurality) of recording vehicles 100 over-the-air, through the mobile communication network 300 (not necessarily at the same time $t_0$ all vehicles 100). In an embodiment, the recording target $T_O$ is transmitted to each recording vehicle 100 upon request from the vehicle 100. Alternatively, the recording target $T_O$ is pushed towards the recording vehicles 100.

In a step S3, in the vehicle 100, the vehicle data recording device 140 downloads (in other words: receives) the recording target $T_O$ from the host data collecting system 200 through the mobile network 300. In the present embodiment, the recording target $T_O$ is received via the radio transmitter-receiver 120 of the vehicle 100 and the I/O interface 141 of the recording device 140. The recording target $T_O$ is provided as input to the path planning module 143.

Then, the vehicle data recording device 140 executes a task of path planning for the vehicle 100. The path planning operation includes the steps S4 to S11 described below, carried out by the path planning module 143. The steps S4 to S11 will be described for one vehicle 100, but the steps can be performed by each of the recording vehicles 100 after reception of the recording target $T_O$.

The route encoder 144 first computes route encodings for a plurality of routes Ri, in the steps S4 to S9. As previously explained, a route encoding for a given route Ri encodes into numerical values an information on predicted values of said route Ri for a plurality of metrics $v_{c_k}$.

In the step S4, at a current time $t_0$, the car navigation system 1440 determines a plurality of routes Ri that the vehicle 100 can take. In the present embodiment, the determination of the routes Ri is performed by execution of a tree expansion algorithm. The tree root can advantageously be the current location of the vehicle 100. The car navigation system explores all the routes that can be taken and builds a tree of possible routes Ri for the vehicle 100. Every branch of the tree represents a specific route Ri. At some point, the algorithm stops the tree expansion based on a given stop criteria (for example a distance, an estimated driving time, or any other appropriate criteria).

In an embodiment, in the step S5, the segmentation block 1441 divides each route Ri determined in the step S4 into route segments RSij. The segment breakdown of the routes Ri is performed by following predefined semantic boundaries like crossings, environmental features, distance, time, navigation system level, or a combination thereof. Such a segmentation allows to encode the features of the routes Ri on a finer level.

In the step S6, the feature encoder 1442 generates a feature vector Vij for each route segment RSij of each route Ri. In other words, each route segment RSij is described into a feature vector Vij. The feature vector can also be regarded as a feature point in a multi-dimensional space in which each dimension corresponds to a given feature class or category for describing the route Ri. The feature vector Vij of a route segment RSij is a kind of representation (in other words: a description) in numerical values of what might be observed along the route segment RSij. In an embodiment, the step S6 includes three sub-steps S60 to S62, described below.

In the step S60, the feature encoder 1442 encodes into numerical values past information on what happened to the recording vehicle 100 just before the current time $t_0$, so as to form a first component Aij of the feature vector Vij. Indeed, at time $t_0$, the data recording device 140 has already recorded past data from the vehicle 100 during the last few minutes and consequently knows about the past. The past information can include a summary of recording data collected by the in-vehicle data recording device 140 during the past period of time leading up to the current time $t_0$. For example, the recording data can include at least part of the following information:

a) environmental information, including information derived from the GPS location of the vehicle like features of the neighborhood (e.g., dining and drinking, groceries, shopping, errands, parks, schools, culture and entertainment, etc.), transit related information (e.g., train station, bus, tram, other), biking infrastructure, or map derived features (e.g., encodings from satellite imagery of GPS location, encodings from street map images of GPS location, etc.):

environmental context information like time of the day, weather information, object presence and distribution (e.g., construction areas, potholes, debris, pedestrians, cars, trucks, motorbikes, bikes, etc.), or environmental acoustic information (e.g., sirens, accident, environmental acoustic profile, etc.);

environmental scenarios like urban, highway, or countryside; road conditions (dry, wet, snow, other;

asphalt, other; missing line markings, yellow line markings, etc.); or driving behavior information (e.g., lane change, breaking, acceleration, taking turns, etc.); or b) vehicle information (e.g., speed, yaw rate, remaining gas level, feature function related signals such as lane change warning, etc.).

The purpose of encoding past recording data collected just before the current point in time $t_0$ (or a summary of the past recording data) is to capture specific conditions and/or environmental features related to the current period of time, like information on the weather, the type of route driven by the vehicle 100, the number of pedestrians in the street, or any other relevant past information recently detected up, that might influence predictions or estimations of the value estimator 1443 about the near future for the routes Ri. The recording data collected during the past period of time leading up to time $t_0$ can be aggregated, for example by adding some values, to obtain a summary of the recording data and limit the quantity of data in the component Aij of the vector Vij.

The information about the past encoded in the first component Aij of the vector Vij can be very informative for the machine learning system (value estimator) 1443. For example, let's consider that, at time $t_0$, it is night and rainy and the vehicle 100 drives in a city, in the vicinity of shops. Usually, there are lots of pedestrians in the city near shops. But, as the machine learning module 1443 knows from the last few minutes that it is raining and it is night, it might not expect so many pedestrians. If a metric is associated with pedestrians, the piece of information that has been encoded in the component Aij of the feature vector Vij, coming from the summary of what has happened in the last few minutes is used by the machine learning model 1443 to better evaluate the value of the segment for the metric associated with pedestrians.

In the step S61, the feature encoder 1442 encodes into numerical values environmental features related to the route segment RSij and relevant for the metrics $v_{c_k}$, in order to form a second component Bij of the vector Vij. The encoded environmental features of the route segment RSij include any type of feature that might be relevant for the metrics (in other words: any type of feature that may be correlated with the metrics). For example, the environmental feature includes at least part of the environmental information previously described. It can include a type of the environment (e.g., urban, highway, countryside, other), a number of shops in the vicinity, the presence of a school in the vicinity, crossings, weather information (for example from a weather forecast service, or present weather), etc. As an illustrative example, let's consider a metric that is a function that determines a number of pedestrians in the surroundings. In that case, the features like the number of shops in the vicinity, the presence of a school in the vicinity, and any other segment feature that might be correlated with the presence of pedestrians can be encoded in the second component Bij of the vector Vij.

Finally, the first component Aij and the second component Bij are concatenated to form the feature vector Vij of the route segment RSij, in a step S62.

Then, in the step S7, the feature vector Vij of each route segment RSij of every route Ri is inputted into the value estimator 1443. The value estimator 1443 can include a machine learning system trained to evaluate the respective values of a route segment RSij, described by a feature vector, for a plurality of predefined metrics $v_{c_k}$ (in other words: for a given set of metrics $v_{c_k}$). The metrics $v_{c_k}$ for which the value estimator 1443 performs a value estimation typically include not only the metrics of the recording target but also other metrics. The value estimator 1443 outputs for each route segment RSij a metric value prediction vector including predicted values of the route segment RSij for the plurality of predefined metrics $v_{c_k}$. The predicted values are advantageously normalized over the segment distance to obtain data value densities.

Optionally, the value estimator 1443 can also output an uncertainty information on the predicted values. The uncertainty information can include uncertainties of the predicted values for all metrics.

At the output of the value estimator 1443, the data value densities (and optionally the uncertainty information) of all the route segments RSij of each route Ri are concatenated by the concatenator 1444 to form a high-dimensional route encoding ENCi of each route Ri, in the step S8. At this stage, the route encoding ENCi of each route Ri has a lot of dimensions because it includes, for each segment RSij of the route Ri, the predicted values for the predefined metrics $v_{c_k}$ and the corresponding uncertainties. In addition, as the routes Ri may have different numbers of route segments RSij, the sizes of the route encodings ENCi may be different from each other.

In an embodiment, in the step S9, the high-dimensional route encoding ENCi is translated (in other words: converted) by the translator 1445 into a fixed-length route encoding ENCi' of lower dimension. The translator 1445 breaks down the high-dimensional route encoding ENCi of each route Ri into a denser encoding ENCi', so as to form a fixed-length description of the overall route Ri in a normalized way. This allows to transform the encoding of each route Ri into an encoding that can be used by the reinforcement learning agent 146 for selecting a route. The length of the route encodings ENCi' corresponds to the fixed input dimensionality of the reinforcement learning agent 146. In an embodiment, the encoding translation aggregates segments to form a route encoding composed of three parts: a short-term part, a mid-term part, and a long-term part, that correspond respectively to three intervals of distance from the current position of the vehicle 100 (short, mid, and long). For example, short-term can corresponds to a distance of approximately 100 meters (m), mid-term to a distance of approximately 1000 m and long-term to a distance of more than 1000 m, for example. However, any other distance values could be used. Any other aggregation of the route encodings ENCi could be used, in order to find a suitable representation for the reinforcement learning agent.

Optionally, in a step S10, the route pre-selector 145 pre-selects a subset of candidate routes. The forming of the route encodings into a normalized representation can integrate the expected rewards and the route features for short, mid, and long-term scenarios. Therefore, the pre-selector 145 can use the normalized route encodings to pick the candidate routes. For example, the pre-selector 145 can just select the most valuable routes. Alternatively, the best candidate route(s) for every recording target could be selected. The uncertainty of the predicted recording values might influence the pre-selected candidates. As an illustrative and non-limitative example, only the five most promising routes Ri can be selected.

In the step S11, the fixed-length route encodings ENCi' of the routes Ri pre-selected in the step S10 (or of all the routes Ri if step S10 is not performed) and an additional environmental information, that is independent of the routes Ri, are provided as inputs to the reinforcement learning agent, or route selector 146. The additional environmental information is information that is independent of the features encoded to generate the feature vectors Vij of the route segments RSij. For example, it can include an information on the 5G bandwidth availability as determined by the vehicle 100, an information on the remaining gas in the vehicle 100, an information on a remaining recording time (e.g., given by the driver), an information on a recording buffer state (i.e., remaining recording space in buffer), or any other information that is independent of (different from) the route features encoded and is relevant for selecting a route to be taken by the vehicle 100 to record data and upload recording data to the host data collecting system 200.

Then, the reinforcement learning agent 146 uses the fixed-length route encodings ENCi' and the additional environmental information, as inputs, to select, among the preselected routes Ri, the route Rs that is expected to maximize or optimize the rewards from the host data collecting system 200 in return for uploading recording data collected along said selected route Rs, for the recording target $T_0$ received as input. In an embodiment, the reinforcement learning agent has the option to stay on the current route. In other words, the reinforcement learning agent can chose to either stay on the current route or to switch to one of the proposed new routes.

In the step S12, the path planning module provides the selected route Rs to the vehicle 100 through the interface 141, when the reinforcement learning agent has decided to change the current route.

Then, the vehicle 100 drives long the selected route Rs and the data recording device 140 records data along the route Rs in a step S12. As previously explained, the recording data is received from the vehicle 100 and can include different types of data, such as raw data, derived data, and/or external data.

In a step S13, the recording data collected (recorded) in the step S12 is transmitted to the host data collecting system 200. In an embodiment, only a part of the recording data is uploaded. If only bad data (of low value) is recorded, it can be decided not to upload the recording data collected.

In a step S14, the host data collecting system 200 receives the successfully uploaded recording data from the recording vehicle 100. The host data collecting system 200 stores the received recording data into a storing infrastructure 400.

In addition, in a step S15, the host data collecting system 200 generates a reward information in return for a successful upload of recording data from the vehicle 100 and transmits the reward information to the vehicle 100 (more precisely to the data recording device 140). The reward information can include different types of rewards to reward different types of actions such as the continuous action of uploading recording data, the action of uploading entirely and successfully the recording, the action of recording and uploading pieces of recording data of high value for the recording target $T_0$, etc. . . . . .

The vehicle data recording device 140 receives the reward information (here via the transmitter-receiver 120 of the vehicle 100) and provides it to the reinforcement learning agent 146 to improve the selection of routes.

In an embodiment, the rewards don't need to be given by the host data collecting system 200. It would be enough to simulate the reward behavior in the vehicle 100, after successful upload.

The machine learning system 1443 is trained in a preliminary step by using historical (past) recording data collected by recording vehicles driving along routes. In an embodiment, at first, the historical recording data is related to a plurality of recordings performed in the past by one or more recording vehicles driving along different routes. Training data are generated from the historical data. For that purpose, each route driven in the past is divided into segments (as in the step S5), the feature vector of each route segment is generated (as in the step S6), and the values of each route segment for the plurality of predefined metrics $v_{c_k}$ are computed by using the historical recording data.

The dataset of training data includes the feature vectors of all the route segments derived from the routes driven in the past, as input training data, and the corresponding segment aggregated average values of the metrics $v_{c_k}$, as output training data. The dataset of training data is provided to the machine learning system 1443 to train it to compute the computed values related to the plurality of metrics for the corresponding route segments. The machine learning system 1443 once trained allows to estimate (predict) a recording value density for each route segment for every metric.

The machine learning system 1443 can be an aggregated model that is in charge of computing all the metrics $v_{c_k}$ for each route segment. Alternatively, the machine learning system 1443 includes N models to compute the respective N metrics.

The reinforcement learning agent of the route selector 146 is trained to decide which one of a plurality of proposed routes should be picked. The training of the reinforcement learning agent of the route selector 146 can use data as previously described. The input training data for the reinforcement learning agent includes route encodings, preferably normalized route encodings, determined based on the simulated data, and the output training data includes scores or numeric values indicating how much the reinforcement learning agent would like to pick a specific route proposal from presented candidate routes.

Example Implementations

Example 1: A computer-implemented method, carried out by a vehicle data recording device (140) in a vehicle (100), including the following steps: downloading (S3), from a host data collecting system (200), a recording target ($T_0$) for recording data along a route, at a current time $t_0$, determining (S4) a plurality of routes (Ri) that the vehicle (100) can take; for each route (Ri), generating a route encoding (ENCi) that encodes in numerical values an information on predicted values of said route (Ri) for a plurality of metrics ($v_{c_k}$), a metric ($v_{c_k}$) being a function assigning a value representing an amount of progress in achieving an elementary recording target to a piece of data; providing the route encodings (ENCi') and additional environmental information that is independent of the routes Ri to a reinforcement learning agent (146) that selects one of the routes (Ri) in order to optimize a reward; recording data (S12) from data sources (110) in the vehicle (100) over time while the vehicle drives along the selected route (Rs); uploading (S13) at least part of the recording data to the host data collecting system (200) and, in return, receiving a reward from the host data collecting system (200); providing (S16) the reward to the reinforcement learning agent (146).

Example 2: The method according to example 1, wherein the step of generating a route encoding (ENCi) for each route (Ri) includes the steps of: dividing (S5) said route into route segments (RSij), and generating a feature vector (Vij) for each route segment (RSij), wherein environmental features related to the route segment (RSij) and relevant for the metrics ($v_{c_k}$) are encoded into numerical values to form a component (Bij) of the feature vector (Vij).

Example 3: The method according to example 2, wherein the step of generating a feature vector (Vij) for each route segment (RSij) includes a step of encoding into numerical values past information on what happened just before the current time $t_0$ to form another component (Aij) of the feature vector (Vij).

Example 4: The method according to any of examples 2 and 3, further including, for each route segment (RSij), a step (S7) of inputting the corresponding feature vector (Vij) into a machine learning system of value prediction (1443) for the plurality of metrics ($v_{c_k}$) and providing, at the output of the machine learning system (1443), a metric value prediction vector including predicted values of said route segment (RSij) for the plurality of metrics.

Example 5: The method according to example 4, wherein the metric value prediction vector of each route segment (RSij) further includes an uncertainty information.

Example 6: The method according to example 4 or 5, wherein the metric value prediction vectors of the segments (RSij) of each route (Ri) being grouped into a high-dimensional route encoding (ENCi), the high-dimensional route encodings (ENCi) of the plurality of routes (Ri) are translated into fixed-length route encodings (ENCi') of lower dimension and the route encodings (ENCi') of fixed-length are provided as inputs to the reinforcement learning agent (146).

Example 7: The method according to any of examples 1 to 6, wherein a selector (145) pre-selects (S10) a short list of the most promising route encodings (ENCi') and only the short list of route encodings (ENC') is provided as input to the reinforcement learning agent (146).

Example 8: The method according to any of examples 4 to 7, further including, in a preliminary step: obtaining historical data related to a plurality of recordings performed when driving along given past routes; dividing each past route into route segments (RSij) and evaluating values of each route segment (RSij) for the plurality of metrics ($v_{c_k}$) based on the historical data; training the machine learning system (1443) to compute the evaluated values related to the plurality of metrics for the corresponding route segments.

Example 9: The method according to any of examples 1 to 8, wherein the plurality of routes Ri are determined by using a tree expansion algorithm.

Example 10: A vehicle data recording device, including at least one interface to receive recording data from data sources in the vehicle and transmit recording data to upload to a host data collecting system; a storing module for storing the recording data; a processor for controlling the execution of the steps of the method according to any of examples 1 to 9.

Example 11: A computer program including instructions to cause the vehicle data recording device of example 10 to execute the steps of the method of any of examples 1 to 9.

Example 12: A computer-readable medium having stored there on the computer program of example 11.

Example 13: A vehicle including the vehicle data recording device according to example 10.

What is claimed is:

1. A computer-implemented method, carried out by a vehicle data recording device in a vehicle, the method comprising:
    downloading, from a host data collecting system to the vehicle data recording device, a recording target ($T_0$) for recording data along a route;
    at a current time ($t_0$), determining a plurality of routes that the vehicle can take;
    for each route (Ri) of the plurality of routes, generating a route encoding including encoding in numerical values information on predicted values of the route (Ri) for a plurality of metrics, a metric ($v_{c_k}$) of the plurality of metrics being a function assigning a value representing an amount of progress in achieving an elementary recording target value of data;
    providing a plurality of route encodings and additional environmental information that is independent of the plurality of routes to a reinforcement learning agent that selects a route of the plurality of routes in order to optimize a reward;
    autonomously controlling operation of the vehicle to drive along the selected route or to remain driving along the selected route;
    recording data from data sources in the vehicle over time while the vehicle drives along the selected route (Rs); and
    uploading at least part of the recorded data from the vehicle data recording device to the host data collecting system.

2. The method according to claim 1, further comprising:
    in return for the uploading of the at least part of the recorded data, receiving a reward from the host data collecting system; and
    providing the reward to the reinforcement learning agent.

3. The method according to claim 1, wherein the generating of a route encoding for each route (Ri) comprises:
    dividing the route (Ri) into route segments, wherein each of the route segments is designated (RSij); and
    generating a feature vector (Vij) for each route segment (RSij),
    wherein environmental features, related to the route segments and relevant for the plurality of metrics, are encoded into numerical values to form a component (Bij) of the feature vector (Vij).

4. The method according to claim 3, wherein generating the feature vector (Vij) for each route segment (RSij) comprises encoding into numerical values past information on what happened before the current time ($t_0$) to form another component (Aij) of the feature vector (Vij).

5. The method according to claim 3, further comprising for each route segment (RSij):
    inputting the corresponding feature vector (Vij) into a machine learning system of value prediction for the plurality of metrics; and
    providing, at an output of the machine learning system, a metric value prediction vector including predicted values of the route segment (RSij) for the plurality of metrics.

6. The method according to claim 5, wherein the metric value prediction vector of each route segment (Rsij) includes uncertainty information.

7. The method according to claim 5, further comprising:
    grouping the metric value prediction vector of each route segment (RSij) of each route (Ri) into a high-dimensional route encoding;
    translating the high-dimensional route encoding of each route (Ri) of the plurality of routes into a fixed-length route encoding of lower dimension; and
    providing the fixed-length route encoding of each route (Ri) of the plurality of routes as inputs to the reinforcement learning agent.

8. The method according to claim 1, further comprising:
    pre-selecting a short list of promising route encodings; and providing only the short list of promising route encodings as input to the reinforcement learning agent.

9. The method according to claim 1, further comprising, in a preliminary operation:
obtaining historical data related to a plurality of recordings performed when driving along given past routes;
dividing each of the past routes into route segments;
evaluating values of each route segment (RSij) for the plurality of metrics based on the historical data; and
training a machine learning system to compute the evaluated values related to the plurality of metrics for corresponding route segments.

10. The method according to claim 1, further comprising determining the plurality of routes using a tree expansion algorithm.

11. The method of claim 1, wherein:
the plurality of routes are determined via a processor of the vehicle;
the route encodings are generated via the processor; and
the plurality of route encodings and the additional environmental information is provided to the reinforcement learning agent of the processor.

12. The method of claim 1, wherein:
the reinforcement learning agent is implemented by a processor of the vehicle, and
the reinforcement learning agent selects the route to be taken by the vehicle.

13. A vehicle data recording device comprising:
at least one interface configured to receive recorded data from data sources in a vehicle and to transmit the recorded data from the vehicle to a host data collecting system;
a memory configured to store the recording data; and
a processor coupled to the memory, the processor configured to execute instructions to:
download, from the host data collecting system to the vehicle data recording device, a recording target ($T_0$) for recording data along a route;
at a current time ($t_0$), determine a plurality of routes that the vehicle can take;
for each route (Ri) of the plurality of routes, generate a route encoding including encoding in numerical values information on predicted values of the route (Ri) for a plurality of metrics, a metric ($v_{c_k}$) of the plurality of metrics being a function assigning a value representing an amount of progress in achieving an elementary recording target value of data;
provide a plurality of route encodings and additional environmental information that is independent of the plurality of routes to a reinforcement learning agent that selects a route (Rs) of the plurality of routes in order to optimize a reward;
controlling operation of the vehicle to drive along the selected route or to remain driving along the selected route;
record data from the data sources in the vehicle over time while the vehicle drives along the selected route (Rs) to produce the recorded data; and
upload at least part of the recorded data from the vehicle data recording device to the host data collecting system.

14. The vehicle data recording device according to claim 13, wherein the processor is further configured to execute instructions to:
receive a reward from the host data collecting system in return for uploading the at least part of the recorded data; and
provide the reward to the reinforcement learning agent.

15. The vehicle data recording device according to claim 13, wherein to generate the route encoding for each route (Ri), the processor is further configured to execute instructions to:
divide the route (Ri) into route segments, wherein each of the route segments is designated (RSij); and
generate a feature vector (Vij) for each route segment (RSij),
wherein environmental features related to the route segments and relevant for the plurality of metrics are encoded into numerical values to form a component (Bij) of the feature vector (Vij).

16. The vehicle data recording device according to claim 15, wherein to generate the feature vector (Vij) for each route segment (RSij), the processor is further configured to execute instructions to encode into numerical values past information on what happened before the current time ($t_0$) to form another component (Aij) of the feature vector (Vij).

17. The vehicle data recording device according to claim 15, wherein the processor is further configured, for each route segment (RSij), to execute instructions to:
input a corresponding feature vector (Vij) into a machine learning system of value prediction for the plurality of metrics; and
provide, at an output of the machine learning system, a metric value prediction vector including predicted values of the route segment (RSij) for the plurality of metrics.

18. The vehicle data recording device according to claim 17, wherein the metric value prediction vector of each route segment (RSij) includes uncertainty information.

19. The vehicle data recording device according to claim 17, wherein the processor is further configured to execute instructions to:
group the metric value prediction vector of each route segment (RSij) of each route (Ri) into a high-dimensional route encoding;
translate the high-dimensional route encoding of each route (Ri) of the plurality of routes into a fixed-length route encoding of lower dimension; and
provide the fixed-length route encoding of each route (Ri) of the plurality of routes as inputs to the reinforcement learning agent.

20. The vehicle data recording device according to claim 13, wherein the processor is further configured to execute instructions to:
pre-select a short list of promising route encodings; and
provide only the short list of promising route encodings as input to the reinforcement learning agent.

21. The vehicle data recording device according to claim 13, wherein the processor is further configured, in a preliminary operation, to execute instructions to:
obtain historical data related to a plurality of recordings performed when driving along given past routes;
divide each of the past routes into route segments, wherein each of the route segments is designated (RSij);
evaluate values of each route segment (RSij) for the plurality of metrics based on the historical data; and
train a machine learning system to compute the evaluated values related to the plurality of metrics for corresponding route segments.

22. A vehicle comprising the vehicle data recording device of claim 13.

* * * * *